(12) United States Patent
Chen

(10) Patent No.: US 8,220,357 B2
(45) Date of Patent: Jul. 17, 2012

(54) BICYCLE SHIFTER

(76) Inventor: Po-Cheng Chen, Taipei Hsien (TW)

( * ) Notice: Subject to any disclaimer, the term of this patent is extended or adjusted under 35 U.S.C. 154(b) by 388 days.

(21) Appl. No.: 12/712,197

(22) Filed: Feb. 25, 2010

(65) Prior Publication Data

US 2011/0203404 A1 Aug. 25, 2011

(51) Int. Cl.
*B62M 25/04* (2006.01)
*B62K 23/04* (2006.01)

(52) U.S. Cl. ............................ 74/502.2; 74/489; 74/527

(58) Field of Classification Search ............... 74/473.14, 74/488, 489, 501.6, 502.2, 527; *B62M 25/04; B62K 23/04*
See application file for complete search history.

(56) References Cited

U.S. PATENT DOCUMENTS

| 5,524,501 | A | * | 6/1996 | Patterson et al. | ........... 74/473.25 |
| 5,615,580 | A | * | 4/1997 | Chen et al. | ................. 74/473.13 |
| 5,666,859 | A | * | 9/1997 | Arbeiter et al. | ................. 74/489 |
| 6,067,875 | A | * | 5/2000 | Ritchey et al. | ............... 74/502.2 |
| 6,209,413 | B1 | * | 4/2001 | Chang | .......................... 74/502.2 |
| 2002/0112559 | A1 | * | 8/2002 | Liu | .............................. 74/502.2 |
| 2002/0189524 | A1 | * | 12/2002 | Chen | ............................ 116/28.1 |
| 2004/0261560 | A1 | * | 12/2004 | Tsai | ............................ 74/473.25 |

* cited by examiner

*Primary Examiner* — James Pilkington
*Assistant Examiner* — Thomas Diaz
(74) *Attorney, Agent, or Firm* — Lin & Associates IP, Inc.

(57) ABSTRACT

A bicycle shifter includes a base having an annular space and first teeth and second teeth defined in the annular space. A tube is fixed to a center of the base. A first rotation member and a second rotation member are installed in the tube and respectively have a first recess and a second recess. An elastic member is restricted in a space defined between the first and second recesses. The elastic member includes two opposite first and second elastic portions which protrude out from the first and second rotation members. The first and second elastic portions are engaged with the first and second teeth, respectively. When rotating the handle connected with the first rotation member, the first elastic portion moves over the first teeth, the second elastic portion simultaneously moves over the second teeth.

6 Claims, 5 Drawing Sheets

BICYCLE SHIFTER

BACKGROUND OF THE INVENTION

1. Field of the Invention

The present invention relates generally to a bicycle shifter which is easy to control gear shifting with less force.

2. The Prior Arts

A conventional derailleur device for a bicycle generally includes sprocket wheels on the rear wheel axle, a chain connected between one of the sprocket wheels and the chain wheels, a derailleur located close to the rear wheel and a shifter mounted to the handlebar of the bicycle. The shifter is connected to the derailleur by a cable such that when rotating the shifter, the cable can be extended or retracted to shift the chain from one sprocket wheel to another one to achieve the purpose of gear change.

The shifters are usually classified into a twist style and a trigger style so that the user can rotate the twist-style shifter or move the trigger-style shifter to control the gear shifting. Most of the shifters have an index mechanism which provides the shifter with discrete stops. Each stop corresponds to one position of the derailleur. This allows the cyclist to know the shifter is precisely operated to a specific gear ratio. Usually, the conventional index mechanism includes an elastic member that has an extension arm and an elastic portion protruded from the extension arm. The elastic portion is movably engaged with inner teeth located at the inner periphery of a casing of the shifter. When rotating the handle or moving the trigger, the elastic portion moves over the inner teeth to generate sound and is positioned at one of the concaves between the teeth. However, when changing the gear ratios, the cyclist needs to apply a force larger than the friction force between the elastic portion and the inner teeth. The forces to shift gears at low gear ratios are different from those at high gear ratios. At some gear ratios, it needs a large force to shift gears, which is likely to make the elastic member accidentally jump over several teeth. Moreover, the force applied by the cyclist has to be large enough to slightly deform the elastic member such that the elastic member can moves from one concave between two inner teeth toward next concave. However, the elastic member engages with the inner teeth at one side only. Thus, it is more likely to happen that the elastic member jumps over several teeth at a time.

SUMMARY OF THE INVENTION

A primary objective of the present invention is to provide a bicycle shifter having an index mechanism that overcomes disadvantages of the conventional design that requires a large force to operate the handle or the trigger.

Compared with the conventional design, a conventional elastic member of the index mechanism has only one extension arm but an elastic member of the index mechanism according to the present invention has two extension arms. Furthermore, the conventional bicycle shifter has only one set of tooth. A base of the bicycle shifter according to the present invention has two sets of teeth corresponding to the two extension arms and each of the extension arms has an elastic portion to engage with the teeth. The elastic member is restricted and driven by rotation members of the bicycle shifter. When rotating the bicycle shifter, the rotation members rotate and slightly squeeze the elastic member. Thus, the friction force between the elastic portions and the teeth is reduced, and the elastic portions are discretely glided over one tooth at a time.

According to the present invention, the bicycle shifter comprises a base, a tube fixed to a center of the base, a first rotation member and a second rotation member installed to the tube and an elastic member located between the first and second rotation members. The base includes an inner wall and an outer wall to define a central hole inside the inner wall and an annular space between the inner wall and the outer wall. First teeth are defined on an interior surface of the outer wall and second teeth corresponding to the first teeth are defined on an exterior surface of the inner wall. The first and second rotation members have a first recess and a second recess, respectively. The elastic member is restricted in a space defined between the first and second recesses. The elastic member includes first and second elastic portions which protrude toward opposite directions. The first and second elastic portions protrude outward from gaps between the first and second rotation members to respectively engage with the first and second teeth. When rotating the handle connected with the first rotation member, the first elastic portion moves over the first teeth, the second elastic portion simultaneously retracts and moves over the second teeth.

The first and second teeth are corresponding to each other and located at different radiuses in the annular space in the base. The first and second elastic portions are symmetric to each other along a radial direction so that the first and second elastic portions are simultaneously engaged with the first and second teeth. When the first and second rotation members are rotated relative to the tube, the first and second elastic portions simultaneously move over the first and second teeth.

The elastic member is integrally formed and made of elastic steel. The elastic member includes a connection portion and two extension arms extended from the connection portion. The first and second elastic portions are located on the two extension arms, respectively.

The first recess of the first rotation member and the second recess of the second rotation member are in U shape. When the first rotation member and the second rotation member are connected with the tube, an opening of the U-shaped first recess faces with that of the U-shaped second recess. Thus the space is defined between the first and second recesses for accommodating the elastic member. The connection portion is received in the first recess and free ends of the two extension arms are received in the second recess. Therefore, the elastic member is restricted between the first and second recesses and the first and second elastic portions are protruded out of the gaps between the first and second rotation members.

The first and second rotation members are separated members. The first and second rotation members are inserted into the tube. The first rotation member includes a plurality of notches defined at an end thereof and the second rotation member includes a plurality of axial blocks corresponding to the notches. When the notches engage with the axial blocks, the opening of the U-shaped first recess faces with that of the U-shaped second recess. Thus the space is defined between the first and second recesses for accommodating the elastic member.

The tube includes a plurality of flexible lips which are engaged with an end of the first rotation member so as to restrict the first and second rotation members from disengaging from the tube.

The characteristic of the present invention is that the first and second recesses slightly squeeze the elastic member to help the two elastic portions simultaneous gliding over two sets of the teeth. The force for gear shifting is reduced. Moreover, the conventional bicycle shifter has only one extension arm to bear all the friction force. The bicycle shifter according to the present invention has two extension arms, and therefore the friction force is evenly distributed to the two elastic portions. It prevents the elastic portions jumping over several teeth from happening.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
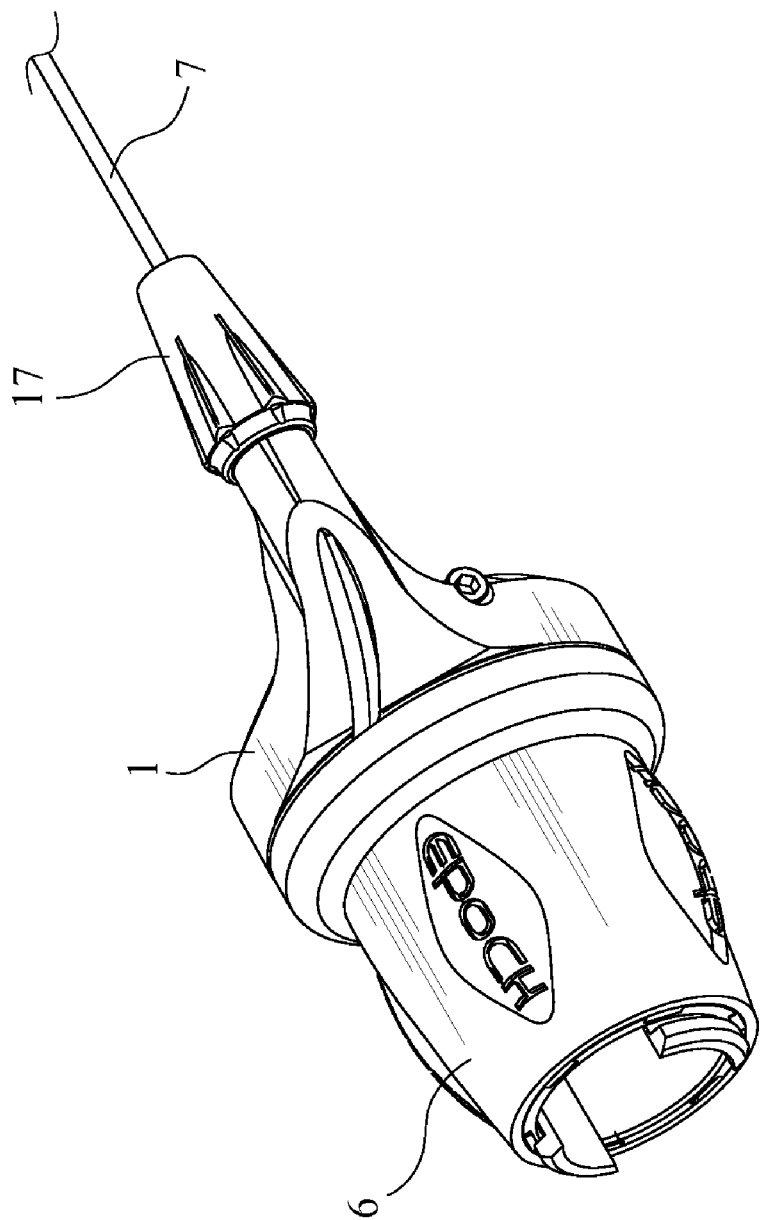
FIG. 1 is a perspective view showing a bicycle shifter in accordance with the present invention.

With reference to the drawings and in particular to FIG. 1, a bicycle shifter according to an embodiment of the present invention includes a base 1 connected with a handle 6. The base 1 has a sheath portion 17 and a cable 7 passes through the sheath portion 17 to be connected to a derailleur (not shown) located close to a rear wheel. By rotating the handle 6 back or forth, the cable 7 is extended or retracted so as to move the derailleur to drive a chain from one sprocket wheel to another.

Figure 2:
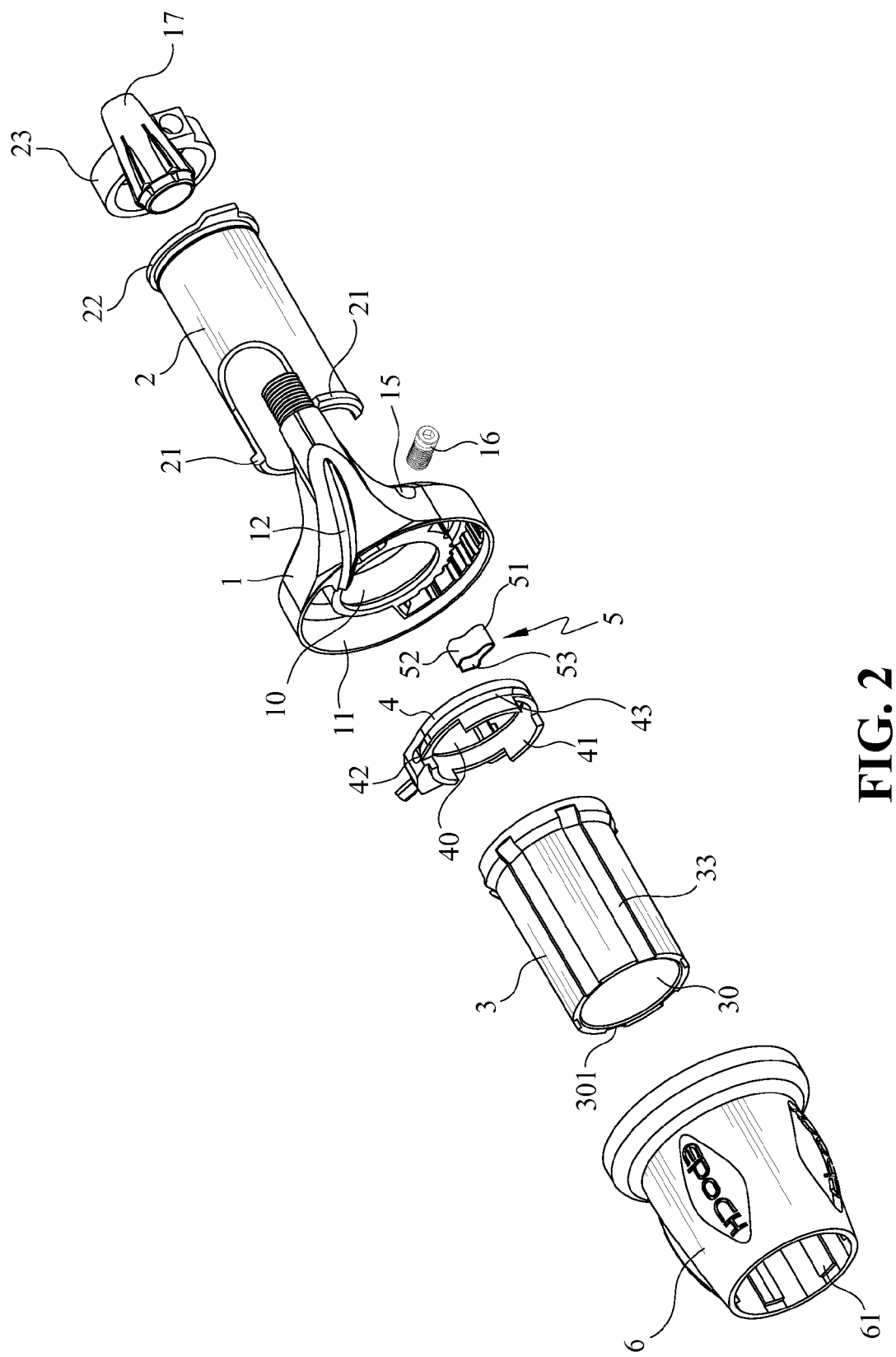
FIG. 2 is an exploded view to show the bicycle shifter in accordance with the present invention.
Figure 3:
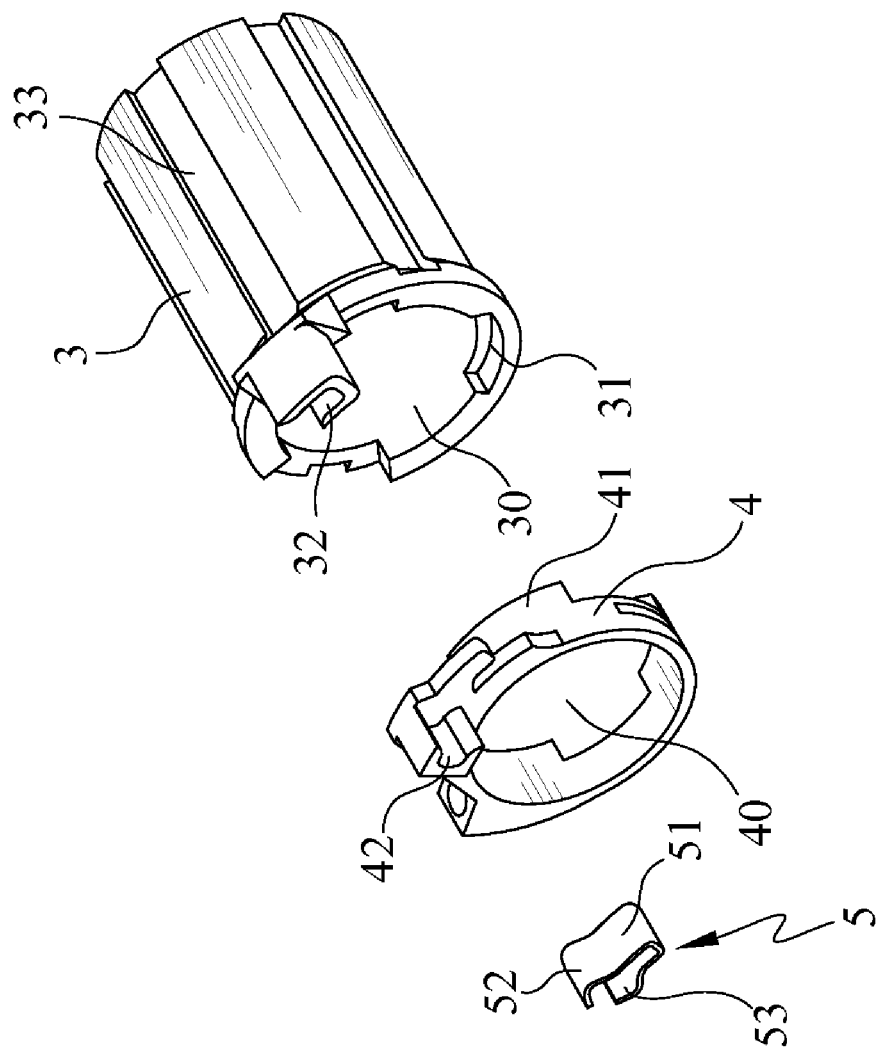
FIG. 3 is an exploded view showing a first rotation member, a second rotation member and an elastic member of the bicycle shifter in accordance with the present invention.

Referring to FIGS. 2 and 3, in addition to the base 1, the bicycle shifter further includes a tube 2, a first rotation member 3, a second rotation member 4 and an elastic member 5. The base 1 includes an inner wall and an outer wall to form a central hole 10 inside the inner wall and an annular space 11 between the inner wall and the outer wall. First teeth 13 are defined on an interior surface of the outer wall and second teeth 14 corresponding to the first teeth 13 are defined on an exterior surface of the inner wall. A groove 12 extends from the annular space 11 to an outside of the base 1. The sheath portion 17 is connected to an end of the groove 12 that is away from the annular space 11. A threaded hole 15 is defined through the inner wall and the outer wall of the base 1 and a bolt 16 is threadedly inserted into the threaded hole 15. The tube 2 is fitted in the central hole 10 and the bolt 16 is pressed against the tube 2, thereby securely connecting the base 1 with the tube 2. One end of the tube 2 includes a plurality of flexible lips 21 which are flexible in the radial direction by the cutouts defined through the wall of the tube 2. The other end of the tube 2 includes a plurality of fixed lips 22 which are not flexible in the radial direction. The tube 2 extends through the central hole 10 and is connected with a fixing member 23. The tube 2 is then fixed to the base 1 by the bolt 16.

Figure 4:
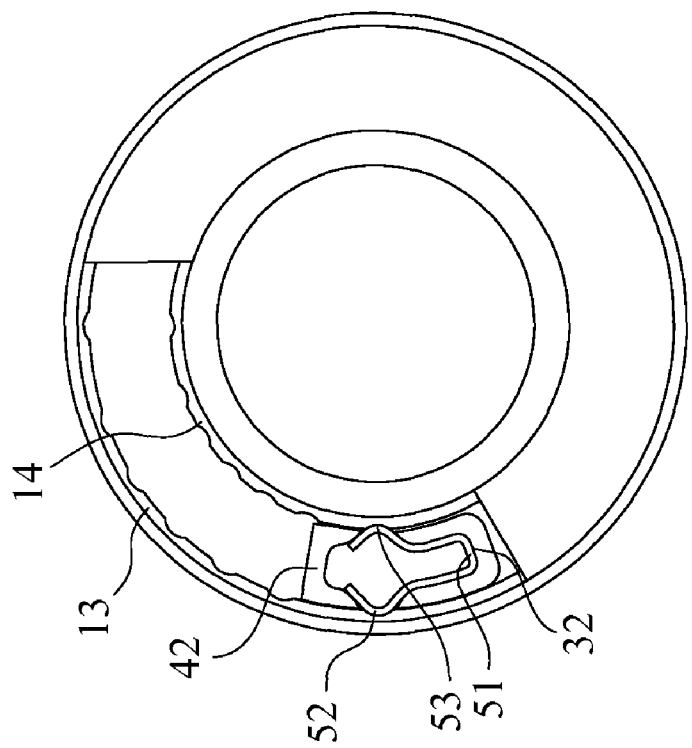
FIG. 4 shows that the first and second rotation members are connected to a base of the bicycle shifter in accordance with the present invention.
Figure 5:
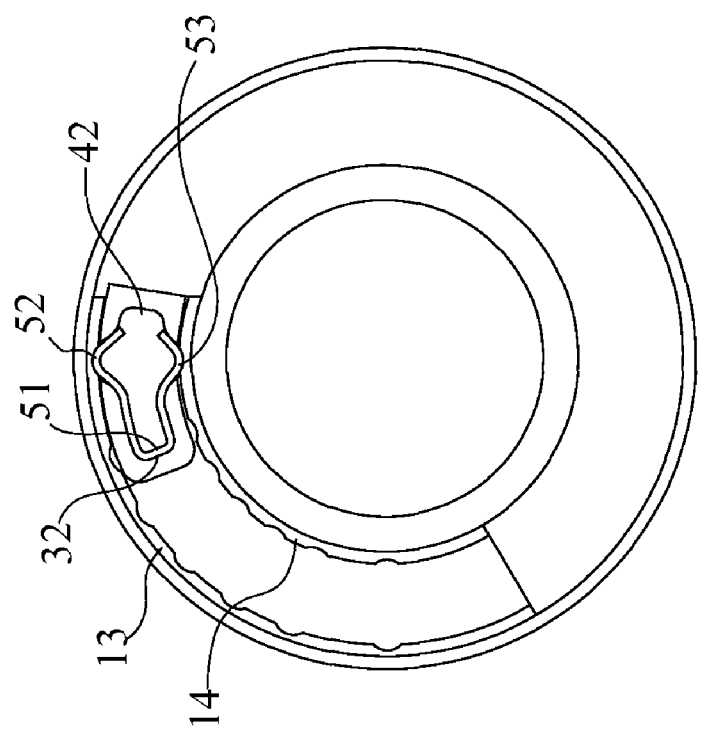
FIG. 5 shows that a handle is rotated an angle and the elastic member is moved relative to first and second teeth.
Figure 6:
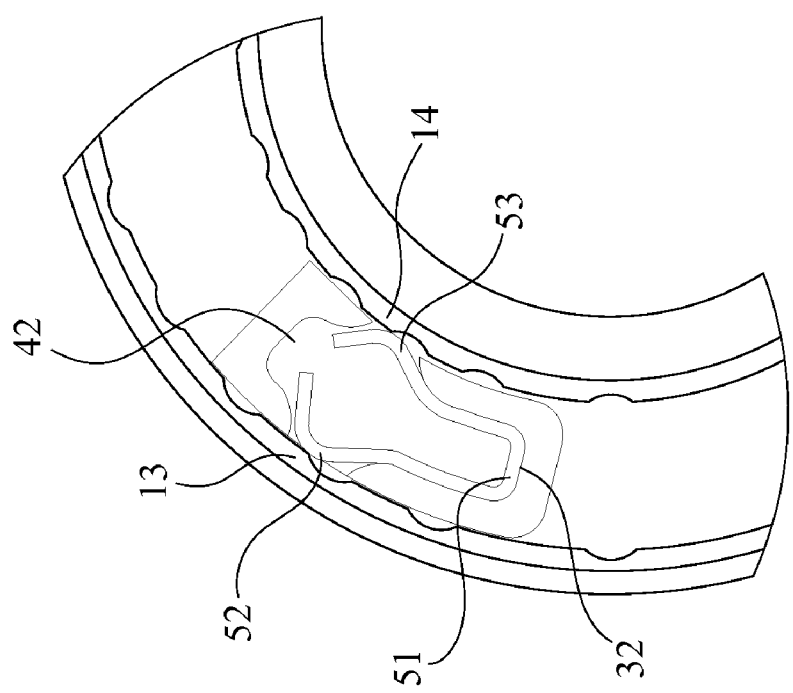
FIG. 6 is a detailed view showing that first and second elastic portions of the elastic member move relative to the first and second teeth when the handle is rotated.

The first rotation member 3 is a tubular member and includes a first hole 30 in an axial direction thereof which allows the tube 2 to pass through, and a plurality of axial slots 33 are defined on an outside thereof. The first rotation member 3 includes a plurality of notches 31 and a first recess 32 defined on an end thereof. The second rotation member 4 is substantially a ring-shaped member and includes a second hole 40 in an axial direction through which the tube 2 extends. A plurality of axial blocks 41 extend from an end of the second rotation member 4 and are corresponding to the notches 31. The second rotation member 4 includes a cable space 43 defined on an outside thereof so as to accommodate the cable 7 wrapped around the second rotation member 4. The second rotation member 4 has a second recess 42. The first recess 32 and the second recess 42 are in U shape and are located corresponding to each other. The axial blocks 41 are inserted into the notches 31. An opening of the first recess 32 faces toward that of the second recess 42. Thus, the U-shaped first and second recesses 32, 42 define a space therebetween for accommodating the elastic member 5, as shown in FIGS. 4-6. Side walls of the first and second recesses 32, 42 are not in contact with each other so as to have two gaps therebetween. Therefore, parts of the elastic member 5 protrude through the gaps.

Referring to FIGS. 4-6, the elastic member 5 is integrally formed and made of elastic steel. The V-shaped elastic member 5 includes a connection portion 51 and two extension arms extended from the connection portion 51. A first elastic portion 52 and a second elastic portion 53 are formed on the two extension arms and protruded outward, respectively. The elastic member 5 is disposed in the space defined between the first and second recesses 32, 42, and the first and second elastic portions 52, 53 are respectively protruded through the gaps between the first and second recesses 32, 42 so as to protrude out of the first and second rotation members 3, 4.

The handle 6 is provided for the users to rotate to change the gear ratios and includes a plurality of axial ribs 61 engaged with the axial slots 33 of the first rotation member 3. Thus, the first rotation member 3 is fixed to and co-rotated with the handle 6.

When assembling, the tube 2 is first fixed with the base 1. The axial blocks 41 of the second rotation member 4 are engaged with the notches 31 of the first rotation member 3. The elastic member 5 is disposed in the space between the first and second recesses 32, 42. The connection portion 51 of the elastic member 5 is received in the first recess 32 and free ends of the extension arms of the elastic member 5 are received in the second recess 42. The elastic member 5 is restricted between the first and second recesses 32, 42, and the first and second elastic portions 52, 53 protrude through the gaps between the first and second recesses 32, 42 so as to protrude out of the first and second rotation members 3, 4. The flexible lips 21 of the tube 2 are then squeezed inward to insert the tube 2 through the second hole 40 of the second rotation member 4 and the first hole 30 of the first rotation member 3. The flexible lips 21 are engaged with a second end 301 of the first rotation member 3 to prevent the first and second rotation members 3, 4 from disengaging from the tube 2. The first and second elastic portions 52, 53 protrude out of the first and second rotation members 3, 4 and are respectively engaged with the first and second teeth 13, 14 of the base 1, as shown in FIG. 4. Then, the first rotation member 3 is fitted in the handle 6 and the axial ribs 61 of the handle 6 are engaged with the axial slots 33 of the first rotation member 3. Therefore, the handle 6 is fixed to the first rotation member 3.

Referring to FIGS. 4 to 6, when the user rotates the handle 6, the first and second rotation members 3, 4 are co-rotated with the handle 6. Because the cable 7 is wound around the second rotation member 4, the cable 7 is extended or retracted by rotation of the second rotation member 4. The elastic member 5 is restricted between the first and second rotation members 3, 4, and therefore the elastic member 5 is co-rotated with the first and second rotation members 3, 4. When rotating clockwise, the first recess 32 is moved forward to slightly squeeze the extension arms of the elastic member 5 inward. Thus, it is easier for the first and second elastic portions 52, 53 gliding over the first and second teeth 13, 14. Similarly, when rotating counter-clockwise, the second recess 42 is moved forward to slightly squeeze the free ends of extension arms of the elastic member 5 inward. Thus, it is easier for the first and second elastic portions 52, 53 gliding over the first and second teeth 13, 14. By this way, the user can rotate the handle 6 easily with less force required. Because the first and second recesses 32, 42 slightly squeeze both of the extension arms of the elastic member 5 inward, the force is applied on the elastic member 5 symmetrically. Therefore, it prevents the first and second elastic portions 52, 53 from accidentally jumping over several teeth at a time.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A bicycle shifter, comprising:
    a tubular base including an inner wall and an outer wall to form a central hole inside the inner wall and an annular space between the inner wall and the outer wall, the base having first teeth defined on an interior surface of the outer wall and second teeth corresponding to the first teeth defined on an exterior surface of the inner wall;
    a tube fixed to the central hole of the base;
    a first rotation member rotatably connected to the tube and having a first recess;
    a second rotation member rotatably connected to the tube and having a second recess, the second rotation member fixed with the first rotation member; and
    an elastic member having a first elastic portion and a second elastic portion which extends toward a direction opposite to that of the first elastic portion, the elastic member disposed in a space defined between the first and second recesses, the first elastic portion and the second elastic portion protruding out from the first and second rotation members, the first elastic portion engaged with the first teeth and the second elastic portion engaged with the second teeth.

2. The bicycle shifter as claimed in claim 1, wherein the first and second teeth are located at different radiuses in the annular space of the base, the first and second elastic portions are located corresponding to each other so that the first and second elastic portions are simultaneously and respectively engaged with the first and second teeth, when the first and second rotation members are rotated relative to the tube, the first and second elastic portions simultaneously move over the first and second teeth.

3. The bicycle shifter as claimed in claim 2, wherein the elastic member is made of elastic steel, is integrally formed and includes a connection portion and two extension arms extended from the connection portion, the first and second elastic portions are located on the two extension arms respectively.

4. The bicycle shifter as claimed in claim 3, wherein the first and second recesses are defined in U shape, an opening of the first recess is corresponding to that of the second recess, the connection portion of the elastic member is received in the first recess and free ends of the extension arms of the elastic member are received in the second recess.

5. The bicycle shifter as claimed in claim 4, wherein the first rotation member includes a plurality of notches defined at an end thereof and the second rotation member includes a plurality of axial blocks corresponding to the notches at an end thereof, the first and second rotation members are connected with the tube, when the notches engage with the axial blocks, the opening of the U-shaped first recess faces toward that of the U-shaped second recess and defines the space for receiving the elastic member.

6. The bicycle shifter as claimed in claim 1, wherein the tube includes a plurality of flexible lips which are engaged with an end of the first rotation member so as to restrict the first and second rotation members from disengaging from the tube.

\* \* \* \* \*